(12) United States Patent
Ochiai et al.

(10) Patent No.: US 6,657,691 B2
(45) Date of Patent: Dec. 2, 2003

(54) FRONT PANEL WITH AN ANTI-REFLECTION LAYER HAVING PARTICULAR COMPOSITIONS

(75) Inventors: Shinsuke Ochiai, Nishinomiya (JP); Kiyoshi Muto, Ashiya (JP)

(73) Assignee: Sumitomo Chemical Company, Limited, Osaka (JP)

(*) Notice: Subject to any disclaimer, the term of this patent is extended or adjusted under 35 U.S.C. 154(b) by 110 days.

(21) Appl. No.: 09/880,828

(22) Filed: Jun. 15, 2001

(65) Prior Publication Data

US 2002/0021393 A1 Feb. 21, 2002

(30) Foreign Application Priority Data

Jun. 16, 2000 (JP) .......................... 2000-181149
Jun. 19, 2000 (JP) .......................... 2000-183068

(51) Int. Cl.$^7$ ............................................. G02F 1/1335
(52) U.S. Cl. ................................................. 349/137
(58) Field of Search ........................... 349/137, 122; 359/603, 884; 428/1, 327

(56) References Cited

U.S. PATENT DOCUMENTS 6,040,881 A * 3/2000 Koyama .......................... 349/8
6,129,980 A * 10/2000 Tsukada et al. ............. 428/327
6,480,250 B1 * 11/2002 Matsufuji et al. ........... 349/113

FOREIGN PATENT DOCUMENTS

| JP | 58046301 | 3/1983 |
| JP | 63004201 | 1/1988 |
| JP | 8297201 | 11/1996 |
| JP | 10186128 | 7/1998 |
| JP | 11064603 | 3/1999 |
| JP | 11126024 | 5/1999 |

* cited by examiner

*Primary Examiner*—Toan Ton
(74) *Attorney, Agent, or Firm*—Birch, Stewart, Kolasch & Birch, LLP (57) ABSTRACT

The present invention provides a display front panel having an anti-reflection layer characterized in that the anti-reflection layer comprises a first layer and a second layer having a smaller optical refractive index value than that of the first layer which are laminated to at least one side of the surfaces of a base plate of a display front panel in a way that the first layer faces the surface(s) of the base plate and the second layer is laminated on the first layer, wherein the first layer is a cured film made of a composition containing (A) a polymerizable compound or an oligomer thereof having at least two unsaturated double bonds, (B) an organo-silicon compound or an oligomer thereof and (C) particles of metal oxide, and the second layer is a cured film made of an organo-silicon compound.

14 Claims, 2 Drawing Sheets

FRONT PANEL WITH AN ANTI-REFLECTION LAYER HAVING PARTICULAR COMPOSITIONS

BACKGROUND OF THE INVENTION

1. Field of the Invention

The present invention relates to a front panel for a display device (hereafter, referred to a display front panel), specifically, relates to a display front panel having an anti-reflection layer for improving the visibility of the display image.

2. Description of the Prior Art

In recent years, a projection television of back projection system and a plasma display television have been used as an image system suited for a larger screen instead of cathode-ray tube (CRT) television. Further, widening of liquid crystal display has been advanced. These displays may often be attached with a front panel for protecting a screen. On a front panel, a hard coat layer comprising a crosslinked polymer is provided to prevent scratch on a surface. Further, in order to enhance a contrast of a screen image, dye or pigment may be added to reduce a transmittance of visible rays.

Since projection televisions, plasma display televisions, and liquid crystal displays are large in size and flat, they receive more reflection images of environmental objects and person on the screen thereof than conventional CRT displays. In addition, since a brightness of an image on the said displays is smaller than that on conventional CRT displays, reflection images of environmental objects will decrease the visibility of the image. Further, scratch-protection ability is required for a display front panel having a function as a protection plate. In addition, in order to enhance a contrast of an image, dye or pigment may be added to a resinous base material to form a display front panel. This reduces a transmittance of visible rays and, accordingly, there is a limitation in the amount of additive such as dye or pigment.

Figure 1:
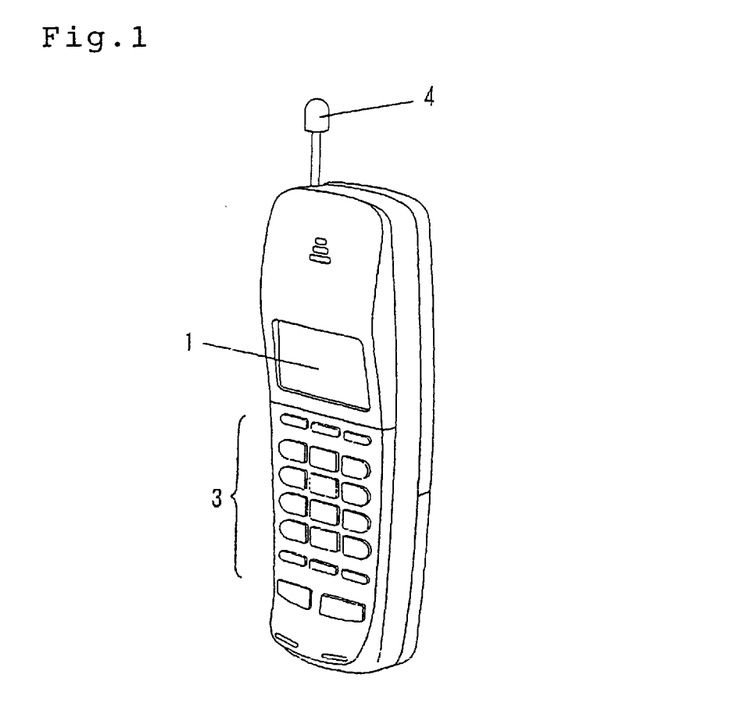
FIG. 1 is a perspective view showing a configuration of a cellular phone.

In resent years, cellular phones have been popularized and many functions other than calling function have been added to them. FIG. 1 shows a perspective view of typical figure of a cellular phone consisting of a display window 1, a control unit 3, an antenna 4 and the like. Many kinds of information such as telephone numbers, mail information and the like are displayed on the display window 1 of the cellular phone, and the display size has been increased gradually. Further, a color display has begun to be popularized. On this display window, a transparent resin plate is generally used as the protective plate and in order to prevent a scratch on the surface, a hard coat layer comprising a crosslinked polymer is provided generally.

An anti-reflection layer, which is provided by laminating a layer having a high optical refractive index value and a layer having a low optical refractive index value in this order over the surface of the base plate, has been known. Here, the layer having a high optical refractive index value has a larger optical refractive index value than that of the base plate and the layer having a low optical refractive index value has a smaller optical refractive index value than that of the layer having a high optical refractive index value. The layer having a high optical refractive index value and the layer having a low optical refractive index value in combination constitute an anti-reflection layer. The layer having a high optical refractive index value and the layer having a low optical refractive index value are usually adjusted in thickness in a way that the optical film thickness (n×d) i.e. the product of an optical refractive index value (n) and a thickness (d) of these layers, are about ¼ and about ½ of the wavelength ($\lambda$) of the visible rays, respectively.

Here, as a layer having a high optical refractive index value, a layer has been known in which a layer is formed by applying and curing a coating composition material on the surface of the base plate. As a composition material for coating, a composition material comprising a compound having two or more unsaturated double bonds in a molecule and metal alkoxide has been known (JP-A-8-297201).

As a layer having a low optical refractive index value, a layer comprising a cured organo-silicon compound has been known (JP-A-63-4201).

However, the anti-reflection plate, where an anti-reflection layer consisting of layers of both high and low optical refractive index values are provided on the surface of the base plate, is poor in scratch-protection ability and the anti-reflection layer tends to be peeled out.

Accordingly, the present invention is intended to provide a display front panel to be used for a projection television, a plasma display television, a liquid crystal display, or a cellular phone display, etc. with little reflection images of environmental objects, with an improved visibility of image, and with excellent scratch-protection ability.

SUMMARY OF THE INVENTION

As a result of extensive studies by the inventors, it has been found that reflection images of environmental objects and persons can be reduced when an anti-reflection layer as described hereinafter is provided on at least one surface of a display front panel. Further, it has been found that hardness of a front panel is improved along with its visibility by providing an anti-reflection layer comprising at least two layers disposed on the surface of a base plate of a front panel wherein a first layer facing the surface of the base plate of the display front panel has a larger optical refractive index value than that of a second layer which is overlaid on the first layer. Particularly, when the first layer having a larger optical refractive index value is a cured film made of a composition containing (A) a polymerizable compound or an oligomer thereof having at least two unsaturated double bonds and being capable of polymerizing by the irradiation of activated energy beams, (B) an organo-silicon compound or an oligomer thereof and (C) particles of metal oxide selected from the group consisting of zirconium dioxide, titanium dioxide, tin dioxide and antimony dioxide, and the second layer having a smaller optical refractive index value is made of a cured organo-silicon compound, are provided, thus a display front panel having not only anti-reflective property but also sufficient scratch-protection ability is obtained.

By providing such an anti-reflection layer, a transmittance of visible rays becomes larger, consequently, an additional amount of dye or pigment can be added to the base plate of the display front panel resulting in an improved contrast of a screen image.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and accompanying drawings which are given by way of illustration only, and thus are not limitative of the present invention and wherein.

DETAILED DESCRIPTION OF THE PREFERRED EMBODIMENTS

The display front panel having an anti-reflection layer of the present invention is mounted on the front side of a display such as a projection television, a plasma display television, a liquid crystal display, or a cellular phone display, etc. A display front panel for a cellular phone is a display window plate. A display is not specifically limited to above-described displays and, the display front panel of the present invention may be used for displays which visibility of image is low by reflection images of environmental objects.

A material for the base plate of the display front panel of the present invention is not restricted so far as it is made of transparent resinous material. For instance, a plastic material such as acrylic resin, polycarbonate resin, polystyrene resin, styrene-acryl copolymer, triacetyl cellulose resin and polyester resin, and an inorganic material such as inorganic glass are included. In the material for the base plate of the display front panel, an additional incorporation of various kinds of additives such as colorant, ultraviolet absorbent, antioxidant, etc. is acceptable. The base plate of the display front panel may be a single layer configuration, two-layer configuration consisting of different resins or colored layer and a transparent layer, etc., or multi-layer configuration consisting of three or more layers. The display front panel is not limited in thickness but is about 0.1 mm to about 10 mm usually. The thickness is appropriately determined in consideration of a size of the base plate or the like thereof. A surface of a display front panel may be smooth or may have minute unevenness. Also it may have a flat surface or may have a curved surface.

On at least one surface of the base plate of the display front panel, an anti-reflection layer is provided. It is preferable that the anti-reflection layer comprises a first layer having a larger optical refractive index value than that of a second layer and a second layer having a smaller refractive index value than that of the first layer and is formed on the base plate of a display front panel in the order of the first layer and second layer.

Although optical reflection index values of these layers are not restricted to specific values so far as a refractive index value of the first is larger than that of the second layer, usually, a refractive index value of the first layer is in the range of about 1.5 to about 2.2, preferably about 1.52 to about 1.8, and a refractive index value of the second layer is in the range of about 1.40 to about 1.49, preferably about 1.40 to about 1.45.

It is recommended that the first layer is formed by curing a coated film comprising a composition containing (A) a compound having at least two double bonds or oligomer thereof, which are capable of being polymerized by irradiation of activated energy beams, (B) an organo-silicon compound or polymer thereof, and (C) particles of metal oxide selected from the group consisting of zirconium dioxide, titanium dioxide, tin dioxide, and antimony dioxide. Hereinafter, (A) the compound or oligomer that is polymerizable by irradiation of activated energy beams and is used for forming the layer having a high refractive index value, is referred as a component (A), (B) an organo-silicon compound and polymer thereof as a component (B), and (C) particles of metal oxide selected from the group consisting of zirconium dioxide, titanium dioxide, tin dioxide, and antimony dioxide as a component (C)

The component (A) is a compound having at least two unsaturated double bonds. The compound can be polymerized by irradiation of activated energy beams. As the compound having at least two unsaturated double bonds, for instance, a polyfunctional acrylate and the like include. Here, the polyfunctional acrylate refers to a compound having at least two acryloyloxy groups and/or methacryloyl groups in a molecule. Hereinafter, acryloyloxy group and methacryloyl group are generally referred to (meth) acryloyloxy group.

As polyfunctional acrylate that can become the component (A), for instance, the following are included; ethylene glycol diacrylate, diethlene glycol diacrylate, 1, 6-hexane diol diacrylate, neobenzyl glycol acrylate, trimethylol propane triacrylate, trimethyrol ethane triacrylate, tetramethylol methane triacrylate, tetramethylol methane tetraacrylate, pentaglycerol triacrylate, pentaerythritol triacrylate, pentaerythritol tetraacrylate, glycerin triacrylate, dipentaerythritol triacrylate, dipentaerythritol tetraacrylate, dipentaerythritol pentaacrylate, dipentaerythritol hexaachrylate, tris (acryloyloxyethyl) isocyanurate, ethylene glycol dimethacrylate, diethylene glycol dimethacrylate, hexane diol dimethacrylate, neobenzyl glycol dimethacrylate, trimethyrol propane trimethacrylate, trimethyrol ethane trimethacrylate, tetramethyrol methan trimethacrylate, tetramethyrol methan tetramethacrylate, pentaglycerol trimethacrylate, pentaerythritol trimethacrylate, pentaerythritol tetramethacrylate, glycerin trimethacrylate, dipentaerythritol trimethacrylate, dipentaerythritol tetramethacrylate, dipentaerythritol pentamethacrylate, dipentaerythritol hexamethacrylate, tris (acryloyloxyethyl) isocyanurate, a phosphazene (meth)acrylate where (meth) acryloyloxy group is introduced to phosphazene ring structure of phosphazene, an urethane (meth)acrylate which is obtained by the reaction of polyisocyanate having at least two isocyanate groups in a molecular structure with a polyol having at least one (meth)acryloyloxy group and at least one hydroxy group, a polyester (meth)acrylate which is obtained by the reaction of a carboxylic acid halogenide having at least two carbonyl groups in a molecular structure with a polyol having at least one (meth)acryloyloxy group and the like.

These compounds comprising the component (A) can be used individually or in combination of two or more compounds. The component (A) may be an oligomer such as dimer or trimer of these compounds.

Since some of these polymerized compounds are available on the market, they can be used as they are. These polymerized compounds on the market include, for instance, "NK ESTER A-TMM-3L" (chemical name: tetramethylol methane triacrylate, placed on sale by Shin Nakamura Chemical Co., Ltd.), "NK ESTER A-9530" (chemical name: dipentaerythritol hexaachrylate, placed on sale by Shin Nakamura Chemical Co., Ltd.), "KAYARAD DPCA Series" (a derivative of dipentaerythritol hexaachrylate, placed on sale by Nippon Kayaku Co., Ltd.), "ALONICS M-8560" (polyester acrylate compound, placed on sale by Toagosei Chemical Industries Co., Ltd.), "NEW FRONTEER TEICA" (chemical name: tris (acryloyloxyethyl) isocyanurate, placed on sale by Dai-ichi Kogyo Seiyaku Co., Ltd.), "PPZ" (phosphazene methacrylate, placed on sale by Kyoei Chemical Co., Ltd.), etc. Some are placed on sale in combination with a solvent. Included, for instance, are "ALONICS UV3701" (placed on sale by Toagosei Chemical Industries Co., Ltd.), "UNIDICK 17-813" (placed on sale by Dainippon Ink & Chemicals, Inc.), "NK HARD M-101" (placed on sale by Shin Nakamura Chemical Co., Ltd.).

The component (B) is an organo-silicon compound or polymer thereof. Here, organo-silicon compounds include, for instance, alkoxy silane, halide silane, acyloxy silane, silazane, etc. These organo-silicon compounds may have a substituent group like alkyl group, aryl group, vinyl group, allyl group, epoxy group, amino group, mercapto group, etc. Examples of these organo-silicon compounds are; alkoxy silane compounds such as tetramethoxysilane, tetraethoxysilane, tetrachlorosilane, methyltrimethoxysilane, methyltrichlorosilane, phenyltrimethoxysilane, phenyltriethoxysilane, dimethyldimethoxysilane, dimethyldiethoxysilane, vinyl trimethoxysilane, vinyl triethoxysilane, N-($\beta$-aminoethyl)-$\gamma$-aminopropyltriethoxysilane, N-($\beta$-aminoethyl)-$\gamma$-aminopropyltrimethoxysilane, $\gamma$-aminopropyldimethoxysilane, $\gamma$-mercaptopropyltrimethoxysilane, mercaptopropylmethyldimethoxysilane, $\gamma$-metacryloxypropylmethyldimethoxysilane, $\gamma$-glycidoxypropyltrimethoxysilane, $\gamma$-glycidoxypropylmethyldimethoxysilane and silazane compound like hexamethyldisilazane.

They can be used individually or in combination of two or more compounds.

The component (B) may be a monomer of these organo-silicon compounds or may be an oligomer consisting of about from 2 to 10 of monomer units or exceeding about 10 of the units. Also the component (B) may be a hydrolysate of organo-silicon compound. The hydrolysate can be obtained by adding an inorganic acid such as hydrochloric acid, phosphoric acid and acetic acid or a base such as sodium hydroxide or sodium acetate to the above organo-silicon compounds.

The component (C) consists of particles of metal oxide selected from the group consisting of zirconium dioxide, titanium dioxide, tin dioxide and antimony dioxide. These particles may be used individually or in combination of two or more kinds. A primary particle diameter of these particles is generally not more than about 0.1 $\mu$m, preferably not more than about 0.05 $\mu$m, and not less than about 0.001 $\mu$m. If the primary particle diameter becomes excessively large, a transparency of the resulting first layer tends to be decreased.

In the present invention, the preferable first layer for constituting anti-reflection layer is a cured film comprising the above components of (A), (B) and (C) wherein the film contains each component in parts by weight ratio based on the total amount of 100 parts by weight of the film as described below:

The component (A) is generally contained from about 20 to about 80, preferably from about 30 to about 60; the component (B) is generally contained from about 1 to about 20, preferably from about 3 to about 15 and the component (C) is generally contained from about 10 to about 70, preferably from about 40 to about 70, respectively.

When the amount of the component (A) is less than about 20 parts by weight, the hardness of the resulting anti-reflection layer tends to be reduced and when it exceeds about 80 parts by weight, the optical refractive index value of the first layer tends to be smallered. When the amount of the component (B) is less than 1 part by weight or when it exceeds about 20 parts by weight, then the hardness of the resulting anti-reflection layer tends to be reduced and when the amount of component (C) is less than about 10 parts by weight, then the optical refractive index value of the first layer tends to be smallered, and the hardness of the resulting anti-reflection layer is reduced when it exceeds about 70 parts by weight.

The thickness of the first layer is appropriately selected in consideration of the refractive index values of the base plate of the display front panel, the first layer and the second layer, and the thickness thereof, etc. In general, the thickness is about 0.01 $\mu$m to about 0.5 $\mu$m. When the thickness is less than about 0.01 $\mu$m, a reflectance of the anti-reflection layer tends to be reduced and, when the thickness exceeds about 0.5 $\mu$m, the reflectance tends to be increased and a rainbow pattern tends to appear due to interference between the refractive index value of the first layer and that of the base plate. In general, the first layer is a layer in which component (B) and component (C) are dispersed in the cured material of component (A).

The composition containing components (A), (B) and (C) may be diluted by a solvent. A solvent is not specifically limited so far as it is capable of dissolving or dispersing these components and being volatilize after coating. It is appropriately selected in consideration of the material or shape of the base plate whereto the solvent is applied, coating method, etc. These solvents include, for instance, alcohol such as methyl alcohol, ethyl alcohol, n-propyl alcohol, iso-propyl alcohol, n-buthyl alcohol, iso-buthyl alcohol, tert.-buthyl alcohol, diacetone alcohol, 2-ethoxyethanol, 2-butoxyethanol, 3-ethoxyethanol, 1-methoxy, 2-propanol and ketone such as acetone, methyl ethyl ketone, and methyl isobutyl ketone, aromatic hydrocarbon such as toluene and xylene, and ester such as aromatic hydrocarbon, ethyl acetate, and butyl acetate. The amount of a solvent is appropriately selected in consideration of a material and figure of the base plate, the coating method or the thickness of the first layer. Generally, with the amount based on the total amount of 100 parts by weight of components (A), (B) and (C), the amount of about 50 to about 10,000 parts by weight is used.

The composition forming a first layer may contain such additives as an initiator, a sensitizer, a stabilizer, an antioxidant, a colorant in addition to the components described above. As an initiator, phenylketone compound, benzophenone compound, etc. can be used usually. For example, "IRGACURE 907" (chemical name: 2-methyl-1-[4-(methylthio)phenyl]-2-morphorinopropane-1-on), "IRGACURE 184" (chemical name: hydroxydichlohexylphenylketone), "DAROCURE 1173" (chemical name: 2-hydroxy-2-methyl-1-phenylpropane-1-on), (these compounds are placed on sale by Ciba Specialty Chemicals K.K.), "EZACURE KIP" (2-hydroxy-2-methyl-1-[4-(1-methyl vinyl) phenyl] propane-1-on oligomer, placed on sale by Nihon SiberHegner K.K.) are cited. For a sensitizer, for instance, "EZACURE EDB" (chemical name: dimethylamine benzoic acid, placed on sale by Nihon Siber-Hegner K.K.), etc. are cited. Those initiators and stabilizers are contained in order to accelerate curing of the composition by an activated energy beams after the composition has been coated on the surface of the base plate.

A coating film is formed by coating the composition containing the components (A), (B) and (C) on the surface of the base plate of the display front panel. To apply the composition on the surface of the base plate of the display front panel, the conventional method of coating, such as, for instance, micro-gravure coating, roll coating, dip coating, spin coating, die coating, cast-transfer coating and spray coating are used.

Next, an activated energy beams are irradiated to the coated film. The activated energy beams include, for instance, ultraviolet rays, electron beams, radiation beams and the like, and are appropriately selected in consideration of the type of the component (A). The time for irradiation by activated energy beams is not specified, but generally arranged within a range of from about 0.1 sec to about 60 sec. In addition, irradiation of the activated energy beams may be carried out at an environmental temperature ranging from about 10° C. to about 40° C. When the composition contains a solvent(s), irradiation may be applied whenever the coated film is in a solvent-containing state or in a solvent-free state after evaporating the solvent fraction(s).

The anti-reflection layer of the present invention has a laminated structure of the second layer on the first layer. The second layer is a layer which has a smaller refractive index value than that of the first layer and is preferably a layer comprising of the cured material of organo-silicon compound. As the organo-silicon compound forming the second layer, the same organo-silicon compound as that previously explained as the component (B) is cited. In addition, the cured material of organo-silicon compound also contains the cured material of polymer or hydrolysate of these compounds.

The second layer may contain silica particles. The silica particles may be usually within a range from about 0.3 nm to about 100 nm in a primary particle diameter and those capable of forming a sol by dispersing the particles in a colloidal state are preferably used. If the primary particle diameter exceeds about 100 nm, a transparency of the second layer tends to be decreased. These silica particles may be porous. The amount of these silica particles used is, in general, not more than about 60 parts by weight and more than about 0.01 parts by weight based on 100 parts by weight of a sum of the silica particles and organo-silicon compound (reduced to the amount of $SiO_2$).

The thickness of the second layer is appropriately selected in consideration of the optical refractive index value of the base plate of the display front panel, the optical refractive index value and thickness of the first layer, and the optical refractive index value of the second layer. In general, it is about 0.1 μm to about 0.5 μm. If the thickness is smaller than about 0.01 μm or exceeds about 0.5 μm, the reflectance of the display front panel tends to be increased.

The second layer is formed on the first layer. In order to form the second layer, a method of coating a composition containing an organo-silicon compound is employed. As the composition, for example, a mixture of an organo-silicon compound and a solvent is used. In addition, the application of a composition containing silica particles provides a layer wherein the silica particles are dispersed in a cured coated film of the organo-silicon compound. The solvent used in this composition is not specifically limited so far as it is capable of dissolving the organo-silicon compound and of being evaporated out after coating the composition to remain the silica particles dispersed in the coated film. The solvent is appropriately selected in consideration of the kind of the second layer, a material and figure of the base plate and a method of coating. It can be selected, however, from the similar solvents shown in case of the composition for making the first layer.

The composition for the second layer may contain additives such as a reaction accelerator, a stabilizer, an antioxidant, a colorant, etc. When using relevant hydrolysate as the organo-silicon compound, the composition may be added with acid such as hydrochloric acid, phosphoric acid, and acetic acid, or base such as sodium hydroxide and sodium acetate.

As the coating method, the same method as conventional one, for instance, micro-gravure coating, roll coating, dipping coating, spin coating, die coating, cast transfer, spray coating, etc. can be used. Thus, a film consisting of a composition containing an organo-silicon compound is formed.

Next, the film is cured. When curing, for instance, heating method may be used. The heating temperature and heating time are appropriately selected in consideration of the kind and the amount of the organo-silicon compound used. Thus a display front panel having an anti-reflection layer consisting of a first layer and a second layer are formed on the surface of the base plate of the display front panel. This display front panel having an anti-reflection layer has high scratch-protection ability because the hardness of the anti-reflection layer is sufficiently high.

A hard coat layer may be disposed between the base plate of the display front panel and the anti-reflection layer. As a hard coat layer, a cured coated film consisting of a compound having at least two functional groups in a molecule. The functional group for making the hard coat layer includes, for instance, an unsaturated double bond such as (meth)acryroyloxy group, a reactive substituent such as epoxy group, or silanol group. Above all, the group having unsaturated double bond are preferably used as it causes curing by irradiation of activated energy beams such as ultraviolet rays, electron beams. Those compounds having at least two unsaturated double bonds are similarly selected from the compounds, which have been previously described as the component (A). They are dissolved in a solvent and placed on sale as "hard coat agent", which can be used. As a commercially available hard coat agent, the same commercially available compounds, which have been previously described as the component (A), are cited.

A hard coat layer can be formed using conventional methods, for instance, by coating hard coat agent on the surface of the resinous base plate to make a film and irradiating activated energy beams to the film. As a coating method, for instance, micro-gravure coating, roll coating, dipping coating, spin coating, die coating, cast transfer, spray coating, etc. can be used. The thickness of the hard coat layer is normally about 0.5 μm to about 50 μm and preferably about 1 μm to about 20 μm. If the thickness is not more than about 0.5 μm, the scratch-protection ability tends to become insufficient and, if it exceeds about 50 μm, the hard coat layer tends to be cracked.

Such hard coat layer may be a hard coat layer having an anti-static ability. The hard coat layer having anti-static ability includes a hard coat layer in which electro-conductive particles are dispersed, or a hard coat layer containing a surface-active agent(s). The hard coat layer in which electro-conductive particles are dispersed includes a cured film in which the electro-conductive particles are dispersed, which cured film is made by curing a film containing a compound having at least two unsaturated double bonds in a molecule. The electro-conductive particle includes a particle of an oxide or a dioxide of a metallic element such as tin, antimony, titanium and indium and a compound oxide of those metallic elements such as indiumtin compound oxide (ITO) and antimony-doped tin oxide. The diameter of the electro-conductive particles is, in general, in a range of from about 0.001 μm to about 0.1 μm in a primary particle diameter. If the primary particle diameter of the electro-conductive particles exceeds about 0.1 μm, a transparency of the hard coat layer will tend to decrease.

These hard coat layers can be formed by coating a hard coat agent containing conductivity particles or a hard coat agent containing surface-active agent, etc. on the surface of the base plate of the display front panel and then curing the hard coat agent. As a hard coat agent containing conductivity particles, for instance, "SHINTORON C-4456" (placed on sale by Shinto Paint Co., Ltd.), "SUMICEFINE R-311" (placed on sale by Sumitomo Osaka Cement Co., Ltd., etc. are available. The hard coat layer thus obtained can have permanent anti-static ability.

The display front panel of the present invention has an anti-reflection layer on the surface of the base plate of the front panel especially with the anti-reflection layer comprising a first layer and a second layer laminated on the first layer. This display front panel, as described above, can be fabricated by, for instance, coating a composition containing a component (A), a component (B), a component (C) to form a film and irradiating activated energy beams on the film to form a first layer, and then coating a composition containing an organo-silicon compound to form a film, and then by curing the film to form a second layer. The anti-reflection layer can be provided on one side of the base plate of the front panel or may be provided on both sides of the base plate. If it is provided on one side, the anti-reflection layer can be located at the display side (back side when viewed from the audience) or can be located at the audience side (front side).

The display front panel having an anti-reflection layer of the present invention is low in reflection images of environmental objects and high in optical transmittance, thereby excellent visibility can be obtained. Especially, when forming this anti-reflection layer in specific two-layer construction, sufficient hardness with excellent scratch-protection ability and favorable adherence will be achieved.

EXAMPLE

The following are details of the present invention referring to some examples. The present invention is not limited by these examples.

The anti-reflection front panel obtained in the example was evaluated in the following method.
(a) Reflectance
One side of the display front panel is roughly finished by steel wool and painted in black and is dried. Then the absolute mirror reflection spectrum at the angle of incidence of 5° on the surface of the other side (the opposite side of the anti-reflection layer) is measured by ultraviolet light spectrophotometer ["UV-3100" manufactured by Shimadzu Corporation] and the wavelength where the reflectance shows the minimum and the minimum value of the reflectance of the same were obtained.
(b) Total Optical Transmittance
This value was measured according to JIS K 7105.
(c) Scratch-protection Ability
This value was evaluated under a pressure of 49 N/cm² on gauze and moving it back and forth on the surface of the side where an anti-reflection layer is provided and by counting the frequency of the movements till a scratch is visually observed on the surface.

(c) Adherence
According to the "tape on checkerboard method" stipulated in JIS K 5400, the adherence was evaluated by counting the number of peeled tapes per 100 grids of the checkerboard provided on the surface of the anti-reflection layer.

Example 1
(1) Forming a Hard Coat Layer
A coating composition for a hard coat layer was formed by mixing 53.6 parts by weight of a marketed hard coat agent containing electro-conductive particles ("SUMICEFINE R-311" manufactured by Sumitomo Osaka Cement Co., Ltd.), 6.9 parts by weight of dipentaerythritol hexaacrylate ("NK ESTER A9530" manufactured by Shin Nakamura Chemical Co., Ltd.), 10.8 parts by weight of methyl ethyl ketone, and 24.2 parts by weight of diacetone alcohol together. By coating this composition for a hard coat layer on the acrylic resin plate ("SUMIPEX E000" of 2 mm in thickness manufactured by Sumitomo Chemical Co., Ltd.) at the lifting speed of 50 cm/minute in the dip coating method and, after drying it at 40° C. for 10 minutes, irradiating an ultraviolet rays, a hard coat layer was provided. This hard coat layer shows an anti-static ability.
(2) Forming a First Layer
A coating composition for a first layer was formed by mixing 1.0 parts by weight of pentaerythritol triacrylate, 0.1 parts by weight of tetraethoxysilane, 1.7 parts by weight of zirconium oxide with an average primary particle diameter of 0.01 μm, 0.2 parts by weight of 1-hydroxydichlohexylphenylketone as an initiator, and 97 parts by weight of isobutyl alcohol as a solvent. By coating this composition for a first layer on the hard coat layer of an acrylic resin plate having a hard coat layer obtained in the above (1) at a lifting speed of 20 cm/minute in the dip coating method and, after drying it at 40° C. for 10 minutes, irradiating an ultraviolet rays, the first layer was provided. Here, the optical refractive index value measured under the condition that a coating composition for a first layer used here is coated and cured on the acrylic resin plate was 1.72.
(3) Forming a Second Layer
A coating composition for a second layer was formed by mixing 0.8 parts by weight of tetraethoxysilane, 98.4 parts by weight of ethanol as a solvent, and 0.8 parts by weight of 0.1N hydrochloric acid. By coating this composition for a second layer on the first layer provided in the above (2) at a lifting speed of 20 cm/minute in the dip coating method and, after drying it at room temperature for 5 minutes and heating it at 80° C. for 20 minutes to provide the second layer, thus a display front panel with an anti-reflection layer was obtained. Here, the optical refractive index value measured under the condition that a coating composition for a second layer used here is coated and cured on the acrylic resin plate was 1.44.

Figure 2:
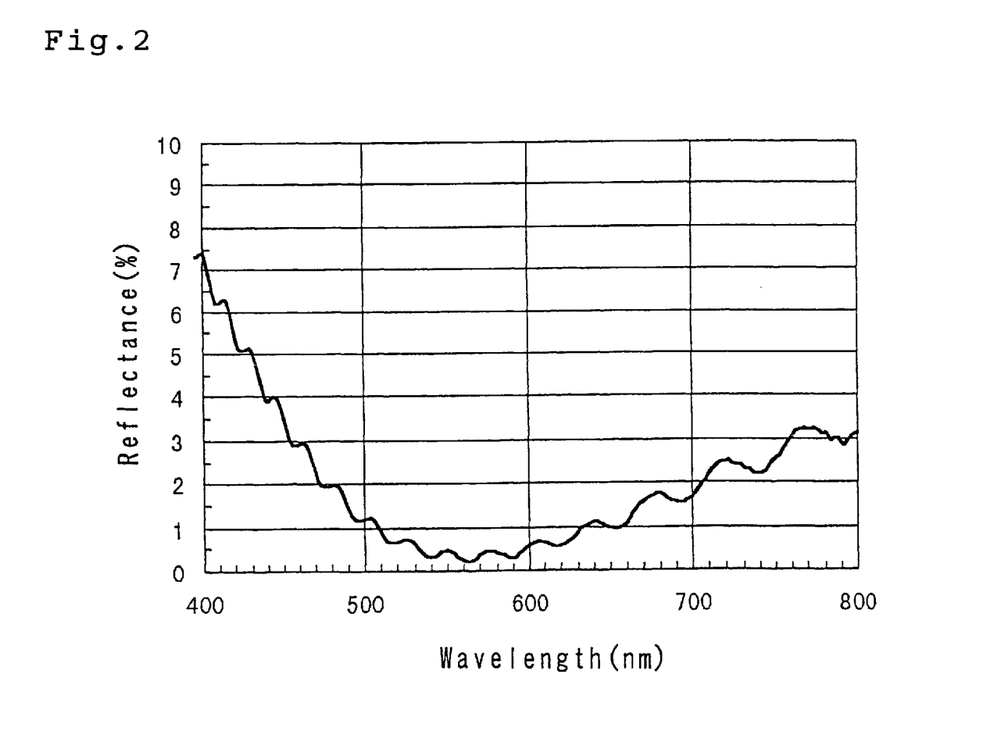
FIG. 2 shows a drawing showing a reflection spectrum of a display front panel having an anti-reflection layer obtained in Example 1.

This display front panel with an anti-reflection layer is provided with a hard coat layer on the surface of the acrylic resin plate and a first layer and a second layer are provided in this order on that hard coat layer. The results of evaluation of this display front panel are shown in Table 1. Also, the reflection spectrum of this display front panel is shown in FIG. 2. When this display front panel was attached on a projection television, reflection of external light was decreased and the visibility of display image was favorable.

Example 2
A coating composition for a first layer was formed by mixing 1.7 parts by weight of zirconium dioxide with an average primary particle diameter of 0.01 μm, 1.0 parts by weight of pentaerythritol triacrylate, 0.1 part by weight of tetramethoxysilane oligomer ("MKC SILICATE MS51" placed on sale by Mitsubishi Chemical Co., Ltd.), 97 parts by weight of isobutylalcohol as a solvent, and 0.2 parts by weight of 1-hydroxydichlohexylphenylketone as an initiator. A display front panel with an anti-reflection layer was obtained by providing a hard coat layer on the surface of an acrylic resin plate as in the case of Example 1 and the first layer provided on the hard coat layer of the acrylic resin plate having the hard coat layer in the same procedure as in Example 1 except for coating the above-mentioned coating composition for a first layer, and then providing the second layer similar to that in Example 1. The results of evaluation of this display front panel are shown in Table 1. When this display front panel was attached on a projection television, reflection of external light was decreased and the visibility of display image was favorable.

Example 3

A display front panel with an anti-reflection layer was obtained in the same manner as in Example 2 except for the use of a colored acrylic resin plate containing dye ("SUMIPEX E109" with a thickness of 2 mm manufactured by Sumitomo Chemical Co., Ltd.). The results of evaluation of this display front panel are shown in Table 1. When this display front panel was attached on a projection display television, reflection of external light was decreased and the visibility of display image was favorable. Since the optical transmittance was decreased by dye, the contrast was also favorable.

Comparative Example 1

A coating composition for a first layer was formed by mixing 1.7 parts by weight of zirconium dioxide with an average primary particle diameter of 0.01 μm, 1.0 parts by weight of pentaerythritol triacrylate, 97 parts by weight of isobutyl alcohol as a solvent, and 0.3 parts by weight of 1-hydroxydichlohexylphenylketone as an initiator. A display front panel with an anti-reflection layer was obtained by providing a hard coat layer on the surface of an acrylic resin plate as in the case of Example 1 and the first layer provided on the hard coat layer of the acrylic resin plate having the hard coat layer in the same procedure as in Example 1 except for coating the above-mentioned coating composition for a first layer, and then providing the second layer similar to that in Example 1. The results of evaluation of this display front panel are shown in Table 1.

Comparative Example 2

As in the same manner as in Example 1, a front panel was formed by providing a hard coat layer on the surface of an acrylic resin plate and without forming an anti-reflection layer. The results of evaluation of this display front panel are shown in Table 1. When this display front panel was attached on a projection television, there was much reflection of external light and the visibility of display image was not favorable.

Comparative Example 3

As in the same manner as in Example 3, a display front panel was formed by providing a hard coat layer on the surface of a colored acrylic resin plate and without forming an anti-reflecting layer. The results of evaluation of this display front panel are shown in Table 1. When this display front panel was attached on a projection television, there was much reflection of external light and the visibility of display image was not favorable. Although the contrast was improved as compared with that in Comparative example 1, the display image was darker than that in Example 3.

TABLE 1

| | With minimum reflectance | | Total optical | Scratch-protection |
| --- | --- | --- | --- | --- |
| | Wavelength (nm) | Reflectance (%) | transmittance (%) | ability (frequency) |
| Example 1 | 564 | 0.23 | 96.2 | 100 and more |
| Example 2 | 592 | 0.24 | 96.2 | 100 and more |
| Example 3 | 553 | 0.24 | 84.3 | 100 and more |
| Comparative Example 1 | 578 | 0.23 | 96.2 | 10 |
| Comparative Example 2 | — | 4.3 | 92.1 | 100 and more |
| Comparative Example 3 | — | 4.3 | 80.2 | 100 and more |

As shown in the above examples, the display front panel with an anti-reflection layer of the present invention shows a low reflectance and high optical transmittance and thus providing excellent visibility. Especially, as shown in Examples 1 through 3, by including an organo-silicon compound in the first layer forming an anti-reflection layer, excellent scratch-protection ability can be obtained.

Example 4

(1) Forming a First Layer

A first layer was provided on an acrylic resin plate having a scratch-protection hard coat layer ("SUMIPEX EMR200" with a thickness of 1 mm manufactured by Sumitomo Chemical Co., Ltd.) by using a coating composition for a first layer as shown in Example 1.

(2) Forming a Second Layer

Figure 3:
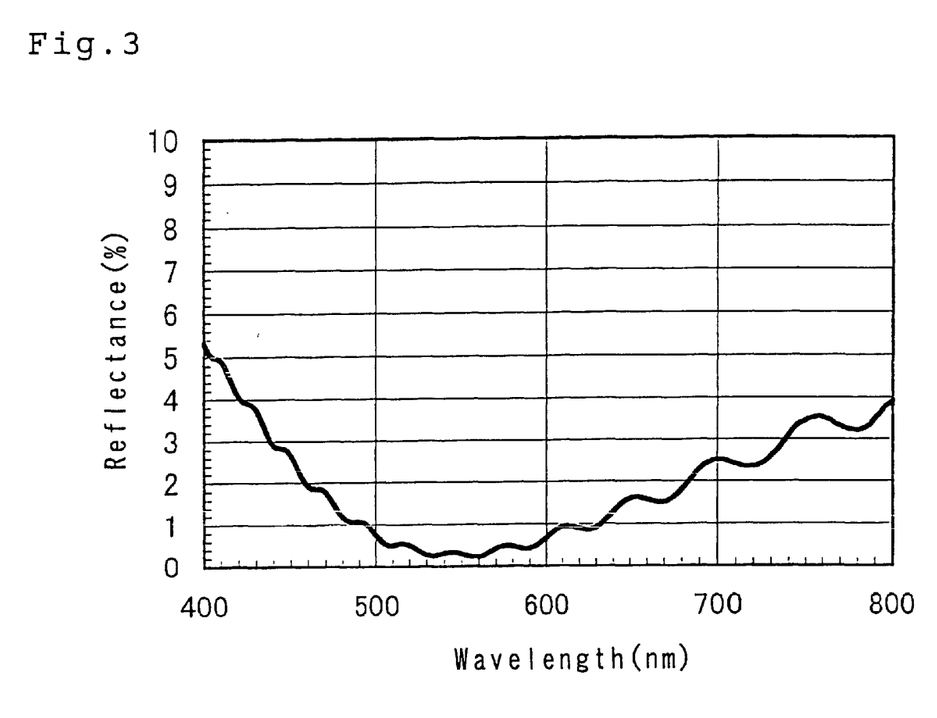
FIG. 3 is a drawing showing a reflection spectrum of a cellular phone window plate with an anti-reflection layer obtained in Example 5.

A display window plate of a cellular phone was obtained by using the same coating composition for a second layer as in Example 1, and providing this coating composition for a second layer on the first layer provided in the above (1) to form the second layer as shown in Example 1. This display window plate of a cellular phone has the first layer and the second layer disposed in this order on the hard coat layer of the acrylic resin plate. The results of evaluation of this display window plate are shown in Table 2. A reflection spectrum of this display window plate is shown in FIG. 3.

Example 5

A display window plate of a cellular phone was obtained by using the same coating composition for a first layer as shown in Example 2, and providing the first layer on the surface of the same scratch-resistant hard coat layer of acrylic resin plate as that used in Example 4 in the same procedure as shown in Example 5 except for using the same coating composition for a first layer as shown in Example 2, and then providing the second layer similar to that in Example 1. The results of evaluation of this display window plate are shown in Table 2.

Comparative Example 4

A display window plate of a cellular phone was obtained by using the same coating compound for a first layer as shown in Comparative Example 1, and providing the first layer on the surface of the same scratch-resistant hard coat layer of acrylic resin plate as that used in Example 4 in the same procedure as shown in Example 4 except for using the same coating compound for a first layer as shown in Comparative Example 1, and then providing the second layer similar to that in Example 1. The results of evaluation of this display window material are shown in Table 2.

TABLE 2

|  | With minimum reflectance | | Scratch-protection ability (frequency) | Adherence (number) |
|---|---|---|---|---|
|  | Wavelength (nm) | Reflectance (%) | | |
| Example 4 | 564 | 0.23 | 100 and more | 0 |
| Example 5 | 592 | 0.24 | 100 and more | 0 |
| Comparative Example 4 | 578 | 0.23 | 10 | 84 |

As shown in this example, the display window plate having an anti-reflection layer of the present invention is low in the reflectance and therefore provides a high optical transmittance. Especially, as shown in Examples 5 and 6, by including an organo-silicon compound in the first layer, excellent scratch-protection ability and adhesion will be achieved.

The invention being described, it will be obvious that the same may be varied in many ways. Such variations are not to be regarded as a departure from the sprit and scope of the invention, and such modifications as would be obvious to one skilled in the art are intended to be included within the scope of the following claims.

What is claimed is:

1. A display front panel having an anti-reflection layer and a base plate, wherein the anti-reflection layer comprises:
   a first layer and a second layer having a smaller optical refractive index value than that of the first layer which are placed on or over at least one side of the surfaces of the base plate in a way that the first layer faces the surface(s) of the base plate and the second layer is laminated on the first layer;
   wherein the first layer is a cured film made of a composition containing
   at least one component (A) selected from the group consisting of a polymerizable compound and an oligomer thereof, compound (A) having at least two unsaturated double bonds and being capable of polymerizing by irradiation of activated energy beams,
   at least one component (B) selected from a group consisting of an organo-silicon compound and an oligomer thereof, the organo-silicon compound as component (B) comprising at least one compound selected from a group consisting of an alkoxy silane, a halide silane, an acyloxy silane and a silazane, and
   (C) particles of metal oxide selected from the group consisting of zirconium dioxide, titanium dioxide, tin dioxide and antimony dioxide; and
   the second layer is a cured film made of an organo-silicon compound.

2. The display front panel having an anti-reflection layer according to claim 1, wherein the composition contains from about 20 to about 80 parts by weight of (A) the polymerizable compound or the oligomer thereof, from about 1 to about 20 parts by weight of (B) the organo-silicon compound or the polymer thereof, and from 10 to 70 parts by weight of (C) the particles of metal oxide based on 100 parts by weight of total amount of (A) the polymerizable compound or the oligomer thereof, (B) the organo-silicon compound or the polymer thereof and (C) particles of metal oxide.

3. The display front panel having an anti-reflection layer according to claim 1, wherein the optical refractive index value of the first layer is about 1.5 to about 2.2 and the refractive index value of the second layer is about 1.40 to about 1.49.

4. The display front panel having an anti-reflection layer according to claim 1, wherein the thickness of the first layer is about 0.01 μm to about 0.5 μm and the thickness of the second layer is about 0.01 μm to about 0.5 μm.

5. The display front panel having an anti-reflection layer according to claim 1, wherein a primary particle diameter of the particles of metal oxide is about 0.001 μm to about 0.1 μm.

6. The display front panel having an anti-reflection layer according to claim 1, wherein the display front panel is a display front panel for a liquid crystal display, a plasma display television or a projection display television.

7. The display front panel having an anti-reflection layer according to claim 1, wherein the display front panel is a display window plate of a cellular phone.

8. The display front panel having an anti-reflection layer according to claim 1, wherein the component (A) comprises at least one compound selected from the group consisting of ethylene glycol diacrylate, diethlene glycol diacrylate, 1,6-hexane diol diacrylate, neobenzyl glycol acrylate, trimethylol propane triacrylate, trimethyrol ethane triacrylate, tetramethylol methane triacrylate, tetramethylol methane tetraacrylate, pentaglycerol triacrylate, pentaerythritol triacrylate, pentaerythritol tetraacrylate, glycerin triacrylate, dipentaerythritol triacrylate, dipentaerythritol tetraacrylate, dipentaerythritol pentaacrylate, dipentaerythritol hexaachrylate, tris (acryloyloxyethyl) isocyanurate, ethylene glycol dimethacrylate, diethylene glycol dimethacrylate, hexane diol dimethacrylate, neobenzyl glycol dimethacrylate, trimethyrol propane trimethacrylate, trimethyrol ethane trimethacrylate, tetramethyrol methan trimethacrylate, tetramethyrol methan tetramethacrylate, pentaglycerol trimethacrylate, pentaerythritol trimethacrylate, pentaerythritol tetramethacrylate, glycerin trimethacrylate, dipentaerythritol trimethacrylate, dipentaerythritol tetramethacrylate, dipentaerythritol pentamethacrylate, dipentaerythritol hexamethacrylate, tris (acryloyloxyethyl) isocyanurate, phosphazene (meth) acrylate urethane (meth)acrylate, and polyester (meth) acrylate and oligomers thereof.

9. The display front panel having an anti-reflection layer according to claim 1, wherein the component (B) comprises at least one compound selected from the group consisting of tetramethoxysilane, tetraethoxysilane, tetrachlorosilane, methyltrimethoxysilane, methyltrichlorosilane, phenyltrimethoxysilane, phenyltriethoxysilane, dimethyldimethoxysilane, dimethyldiethoxysilane, vinyl trimethoxysilane, vinyl triethoxysilane, N-(β-aminoethyl)-γ-aminopropyltriethoxysilane, N-(β-aminoethyl)-γ-aminopropyltrimethoxysilane, γ-aminopropyldimethoxysilane, γ-mercaptopropyltrimethoxysilane, mercaptopropylmethyldimethoxysilane, γ-metacryloxypropylmethyldimethoxysilane, γ-glycidoxypropyltrimethoxysilane, γ-glycidoxypropylmethyldimethoxysilane and hexamethyldisilazane and oligomers thereof.

10. The display front panel according to claim 1, wherein the organo-silicon compound in the second layer comprises at least one compound selected from a group consisting of an alkoxy silane, a halide silane, an acyloxy silane and a silazane.

11. The display front panel according to claim 10, wherein the organo-silicon compound in the second layer comprises at least one compound selected from the group consisting of tetramethoxysilane, tetraethoxysilane, tetrachlorosilane, methyltrimethoxysilane, methyltrichlorosilane, phenyltrimethoxysilane, phenyltriethoxysilane, dimethyldimethoxysilane, dimethyldiethoxysilane, vinyl trimethoxysilane, vinyl triethoxysilane, N-(β-aminoethyl)-γ-aminopropyltriethoxysilane, N-(β-aminoethyl)-γ-aminopropyltrimethoxysilane, γ-aminopropyldimethoxysilane, γ-mercaptopropyltrimethoxysilane, mercaptopropylmethyldimethoxysilane, γ-metacryloxypropylmethyldimethoxysilane, γ-glycidoxypropyltrimethoxysilane, γ-glycidoxypropylmethyldimethoxysilane, hexamethyldisilazane, and oligomers thereof.

12. The display front panel according to claim 1, wherein the display front panel further comprises a hard coat layer.

13. The display front panel according to claim 12, wherein the hard coat layer has a thickness of from about 0.5 μm to about 50 μm.

14. The display front panel according to claim 12, wherein the hard coat layer is placed between the base plate and the anti-reflection layer.

* * * * *